United States Patent [19]

Pease

[11] Patent Number: 5,281,144
[45] Date of Patent: Jan. 25, 1994

[54] MATH FACTS GAME APPARATUS

[76] Inventor: Crystal R. Pease, 715 Cypress St., Ravenswood, W. Va. 26164

[21] Appl. No.: 20,548

[22] Filed: Feb. 22, 1993

[51] Int. Cl.$^5$ ............................................. G09B 19/22
[52] U.S. Cl. .................................... 434/201; 434/208; 434/188
[58] Field of Search ............... 434/208, 190, 188, 254, 434/201; 446/153; 273/126 A, 126 R; 40/572, 552

[56] References Cited

U.S. PATENT DOCUMENTS

| | | | |
|---|---|---|---|
| 2,849,819 | 9/1958 | Murphy et al. | 446/153 |
| 2,892,267 | 6/1959 | Harvey | 434/208 |
| 4,532,579 | 7/1985 | Merryman | 40/552 X |

FOREIGN PATENT DOCUMENTS 1547519  10/1969  Fed. Rep. of Germany ...... 434/208

Primary Examiner—Gene Mancene
Assistant Examiner—Jeffrey A. Smith
Attorney, Agent, or Firm—Leon Gilden

[57] ABSTRACT

A matrix of discs each having a first end wall spaced from a second end wall, having a cavity therebetween, including a weighted portion to provide for the discs to sink within a body of water, such as a swimming pool. The first and second end walls include contrasting digital enumerations, wherein individuals are addressed math problems and the solutions to the problems are indicated by a numerical sum to be retrieved from within a swimming pool and the like by participating individuals.

3 Claims, 4 Drawing Sheets

MATH FACTS GAME APPARATUS

BACKGROUND OF THE INVENTION

1. Field of the Invention

The field of invention relates to math game structure, and more particularly pertains to a new and improved math facts game apparatus wherein the same is arranged for the projection of discs within a swimming pool to permit retrieval of certain of the discs as solutions to posed math problems.

2. Description of the Prior Art

Mathematical type game apparatus is available in the prior art and indicated by such apparatus as presented in U.S. Pat. No. 4,452,588 wherein a plurality of dice members having numerals thereon are employed in a mathematical game organization.

U.S. Pat. Nos. 5,033,754; 4,334,869; and 3,708,169 are further examples of mathematical type game structure, wherein U.S. Pat. No. 4,223,888 to Greene sets forth a game for use in swimming pools having target structure mounted overlying the swimming pool.

The instant invention addresses deficiencies of the prior art by employing game structure for use and retrieval relative to a swimming pool bottom surface as solutions relative to posed math problems and in this respect, the present invention substantially fulfills this need.

SUMMARY OF THE INVENTION

In view of the foregoing disadvantages inherent in the known types of game apparatus now present in the prior art, the present invention provides a math facts game apparatus wherein the same is directed to employing a plurality of weighted cylindrical discs for projection into a swimming pool permitting retrieval of the discs, wherein numerical designations on the discs are sought as solutions to posed math problems. As such, the general purpose of the present invention, which will be described subsequently in greater detail, is to provide a new and improved math facts game apparatus which has all the advantages of the prior art game apparatus and none of the disadvantages.

To attain this, the present invention provides a matrix of discs, each having a first end wall spaced from a second end wall, having a cavity therebetween, including a weighted portion to provide for the discs to sink within a body of water, such as a swimming pool. The first and second end walls include contrasting digital enumerations, wherein individuals are addressed math problems and the solutions to the problems are indicated by a numerical sum to be retrieved from within a swimming pool and the like by participating individuals.

My invention resides not in any one of these features per se, but rather in the particular combination of all of them herein disclosed and claimed and it is distinguished from the prior art in this particular combination of all of its structures for the functions specified.

There has thus been outlined, rather broadly, the more important features of the invention in order that the detailed description thereof that follows may be better understood, and in order that the present contribution to the art may be better appreciated. There are, of course, additional features of the invention that will be described hereinafter and which will form the subject matter of the claims appended hereto. Those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new and improved math facts game apparatus which has all the advantages of the prior art game apparatus and none of the disadvantages.

It is another object of the present invention to provide a new and improved math facts game apparatus which may be easily and efficiently manufactured and marketed.

It is a further object of the present invention to provide a new and improved math facts game apparatus which is of a durable and reliable construction.

An even further object of the present invention is to provide a new and improved math facts game apparatus which is susceptible of a low cost of manufacture with regard to both materials and labor, and which accordingly is then susceptible of low prices of sale to the consuming public, thereby making such math facts game apparatus economically available to the buying public.

Still yet another object of the present invention is to provide a new and improved math facts game apparatus which provides in the apparatuses and methods of the prior art some of the advantages thereof, while simultaneously overcoming some of the disadvantages normally associated therewith.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein:

FIG. 1 is an isometric illustration of a prior art mathematical game apparatus, wherein the plurality of dice members are of two different colorations employed in mathematical solutions relative to subtraction, division, and the like.

DESCRIPTION OF THE PREFERRED EMBODIMENT

Figure 1:
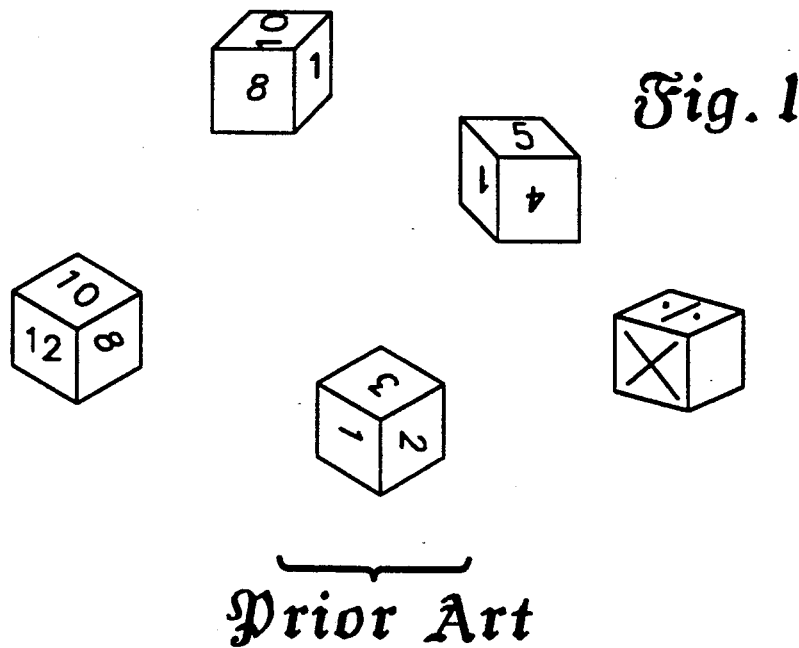
Figure 2:
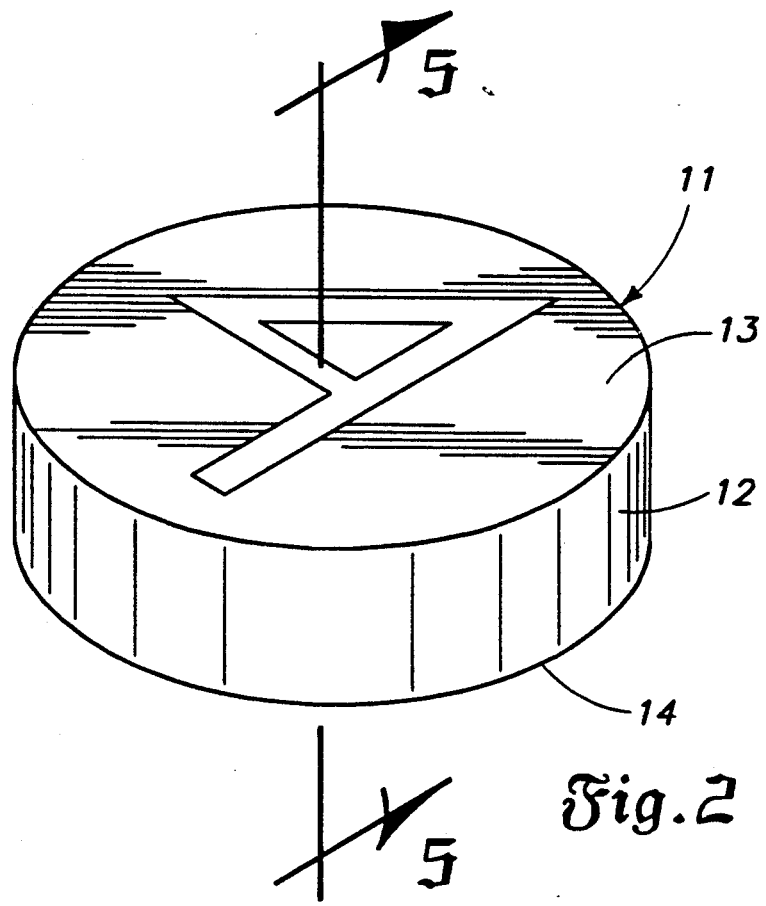
FIG. 2 is an isometric illustration of a disc structure employed by the invention.

With reference now to the drawings, and in particular to FIGS. 2 to 9 thereof, a new and improved math facts game apparatus embodying the principles and concepts of the present invention and generally designated by the reference numeral 10 will be described.

Figure 3:
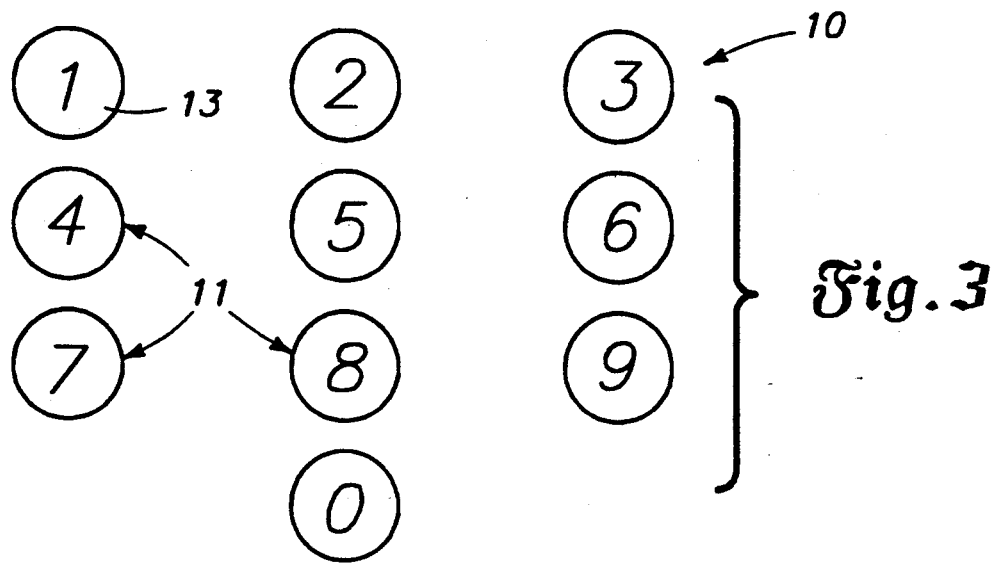
FIG. 3 is an isometric illustration of the disc members employed by the invention.
Figure 4:
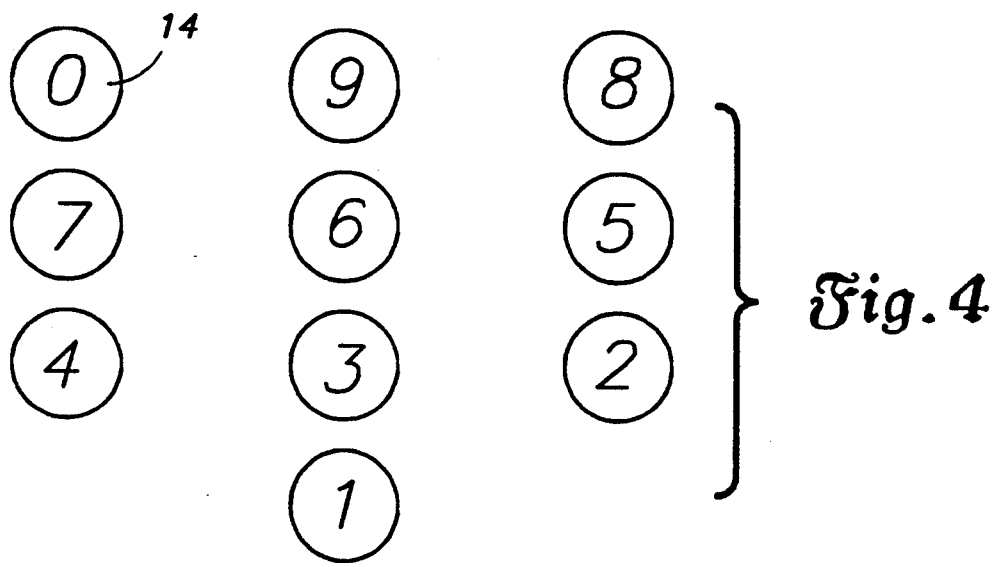
FIG. 4 is an orthographic view of the disc members, and more specifically the second end walls of the disc members relative to the first end walls of the disc members, illustrated in FIG. 3.
Figure 5:
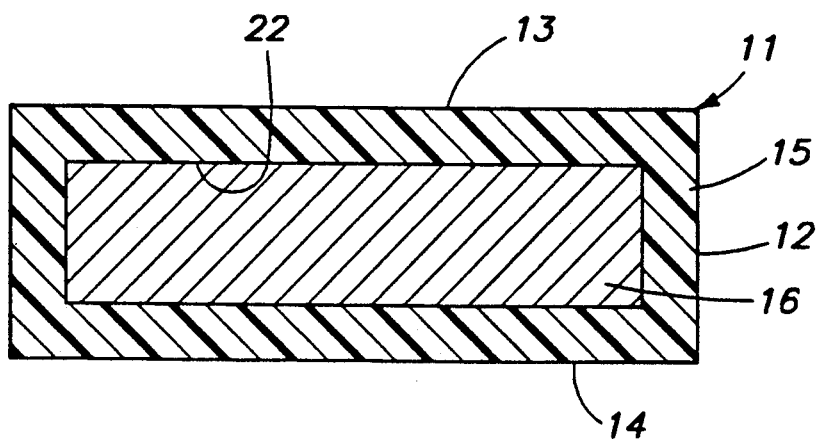
FIG. 5 is an orthographic view, taken along the lines 5—5 of FIG. 2 in the direction indicated by the arrows.
Figure 6:
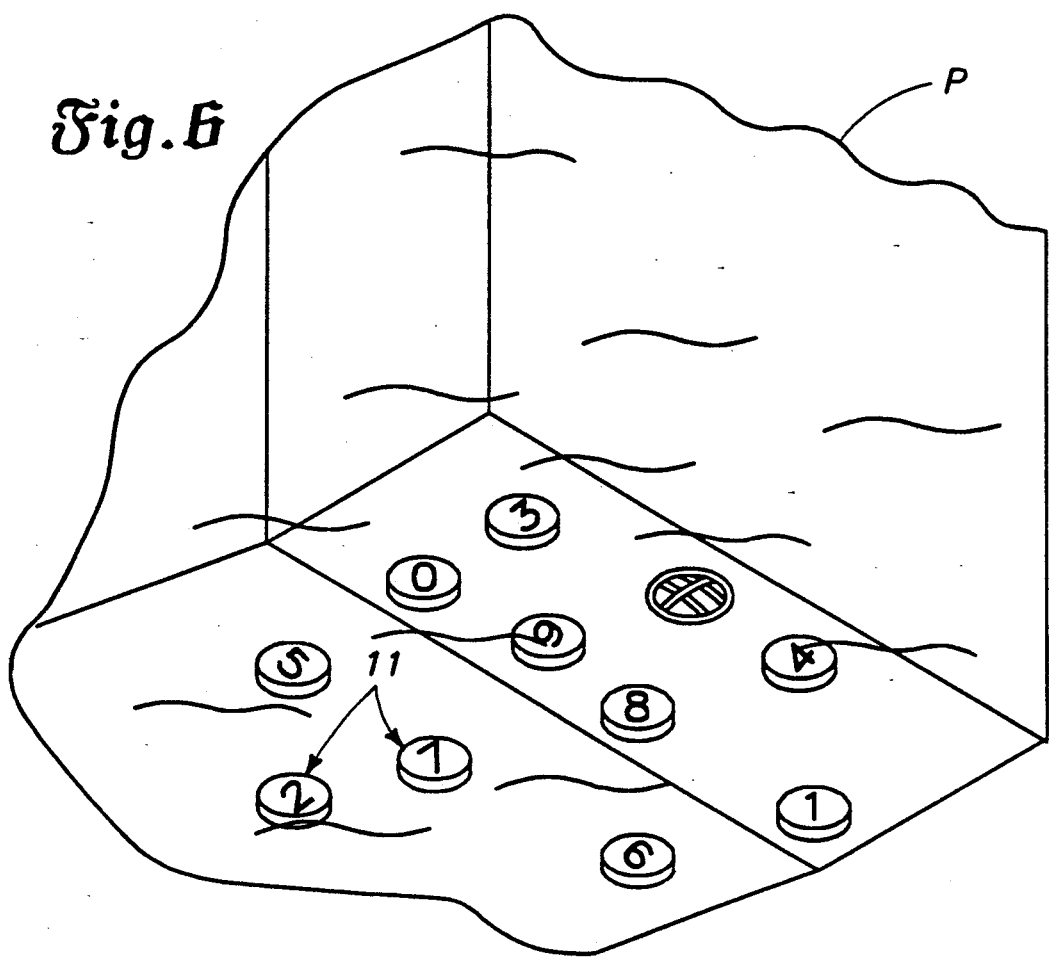
FIG. 6 is an isometric illustration of the disc members positioned within a swimming pool, and more specifically the bottom surface thereof.

More specifically, the math facts game apparatus 10 of the instant invention essentially comprises a plurality of disc members 11 whose construction includes a disc side wall 12 of continuous configuration, with the disc having a first end wall 13 spaced from and parallel a disc second end wall 14, with each of the discs first and second end walls 13 and 14 depicted in the respective FIGS. 3 and 4 indicating the respective first and second end walls 13 and 14 to provide for each disc having contrasting numerical designations thereon. The disc members 11 accordingly define an outer housing shell 15, with the side wall 12 and the first and second spaced end walls 13 and 14 to thereby provide for a disc housing cavity 22, with the discs indicated in FIG. 5 having a weighted core 16 to effect a specific gravity greater than one of the disc member 11 to promote the sinking of each disc member within a pool "P", as indicated in FIG. 6 to position the discs on the pool floor. In this manner, various mathematical problems are directed to individual players, and the individual players to provide for a solution to the problems are directed to retrieve a single or plurality of the disc members 11 from the pool floor, with the numerical designations on the first and second end walls to correspond to solution to random numerical problems directed.

Figure 7:
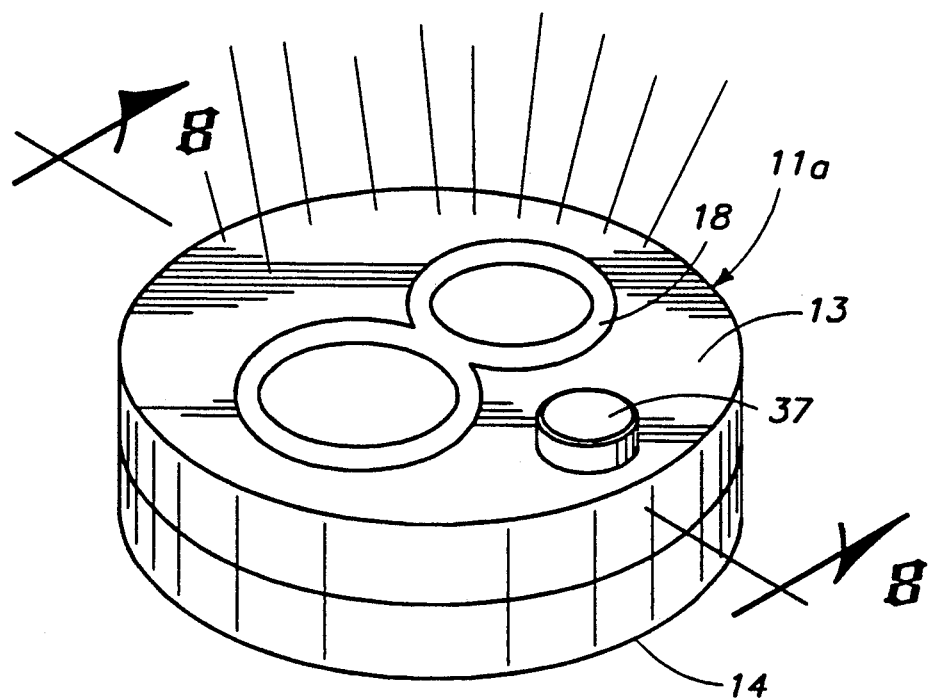
FIG. 7 is an enlarged isometric illustration of a modified disc structure, as employed by the invention.
Figure 8:
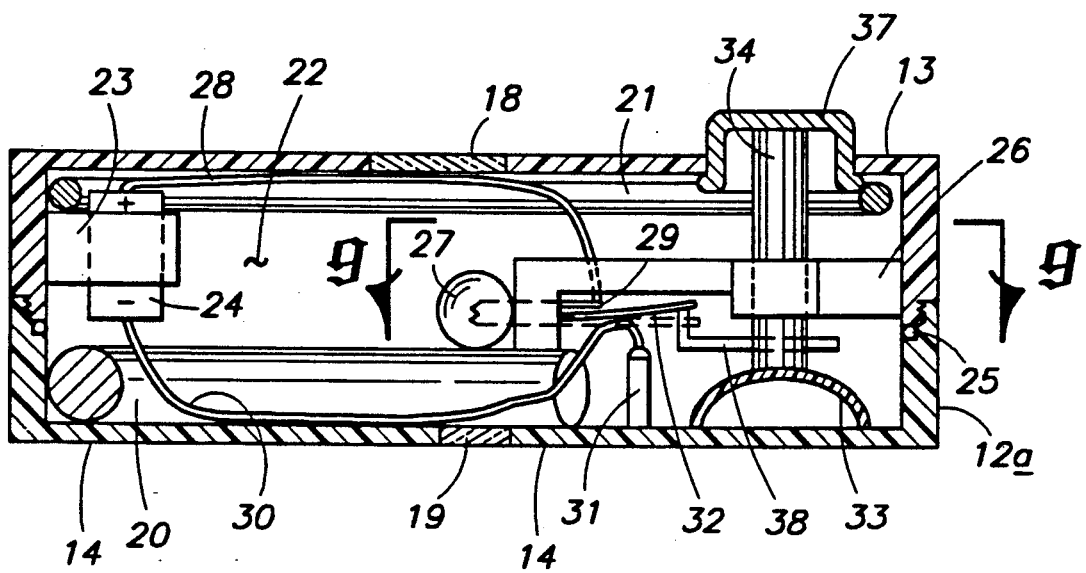
FIG. 8 is an orthographic view, taken along the lines 8—8 of FIG. 7 in the direction indicated by the arrows.
Figure 9:
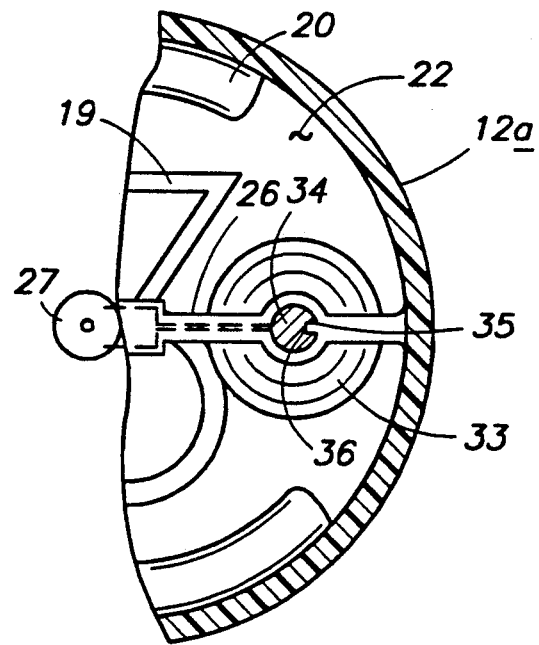
FIG. 9 is an orthographic view, taken along the lines 9—9 of FIG. 8 in the direction indicated by the arrows.

A modified disc member construction 11a is indicated in the FIGS. 7-9 to be employed by a single or plurality of the disc members, such as employed in the FIG. 6. The modified disc member 11a includes a modified side wall 12a that is separable for access to contents within the outer housing shell 15, and more specifically to the disc housing cavity 22. A sealing ring 25 coextensively directed through the side wall 12a provides for fluid-tight sealing relative to the housing cavity 22.

Weighting of the structure includes a first weighted ring portion 20 and a second weighted ring portion 21 mounted within the housing cavity 22 positioned in contiguous communication against respective first and second end walls 13 and 14 to provide for the specific gravity to be greater than one for the sinking of the discs relative to the pool floor, in a manner as indicated in FIG. 6. Further if required, the outer housing shell 15 may be formed of a dense material such as lead and the like to effect this specific gravity determination. Within the housing cavity 22 is a battery bracket 23 mounted between the first and second weighted ring portions 20 and 21 mounting a battery 24 in a replaceable manner. The battery 24 includes electrical communication to illumination bulb 27 mounted to an illumination bulb mounting bracket 26 that extends from the side wall 12a into the housing cavity 22 medially of the first and second end walls 13 and 14. A first transparent window 18 and a second transparent window 19 are formed within respective first and second end walls 13 and 14, with the bulb positioned between the windows 18 and 19. The first and second transparent windows 18 and 19 are of respective first and second numerical configurations, such as indicated in the FIGS. 3 and 4 and 7 and 9 for example. A first electrical wire 28 is in electrical communication between the battery 24 and the illumination bulb 27 and directed to a first bulb contact 29. A second bulb electrical spring contact plate 32 is mounted in electrical communication with a bulb 27 in spring-biased communication to a second bulb contact post 31 fixedly mounted within the cavity 22 to the second end wall 14, with a second electrical wire 30 directed from the second bulb contact post 31 to the battery 24. A suction cup 33 is mounted within the cavity 22 to the second floor in alignment with a push button cap 37. Between the suction cup 33 and the push button cap 37 is a slide post 34 slidably mounted within the housing 22, and more specifically within the illumination bulb mounting bracket 26 (see FIG. 9) and maintained in alignment relative to the bracket 26 preventing rotation relative to the bracket 26 by the use of a slide post groove 35 receiving a bulb mounting bracket rib 36. An L-shaped abutment arm 38 orthogonally mounted to the slide post between the mounting bracket 26 and the suction cup 33 is in biased abutment with the second bulb electrical spring contact plate 32 to displace the spring contact plate 32 when the suction cup 33 is in a convex configuration abutting the slide post 34. In this manner, the L-shaped abutment arm 38 engages the spring contact plate 32 to effect a spacing between the second bulb contact post 31 and the spring contact plate 32 to discontinue electrical communication to the bulb 27. Initially, the push button cap 37 is projected downwardly to effect temporary securement of the suction cup 33 to the second end wall 14 thereby displacing the abutment arm 38 relative to the spring contact plate 32 permitting illumination of the illumination bulb as the spring contact plate 32 is in communication with the second bulb contact post 31. The suction cup 33 subsequently releases relative to the second end wall 14 in a configuration as illustration in FIG. 8 to the second position from the first position when the spring contact plate 32 is in communication with the second bulb contact post 31. In the second position, the bulb ceases illumination. Illumination accordingly assists individuals in the retrieving of the disc relative to the pool floor, as well as providing for a time sequence permitting the individuals a predetermined time only to retrieve the discs, whereupon subsequently as the bulb extinguishes, the retrieving individual is no longer availed of that disc 11a in the solution of the aforenoted mathematical problem posed.

As to the manner of usage and operation of the instant invention, the same should be apparent from the above disclosure, and accordingly no further discussion relative to the manner of usage and operation of the instant invention shall be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as being new and desired to be protected by Letters Patent of the United States is as follows:

1. A math facts game apparatus, comprising,
a plurality of disc members, each disc member of said disc members having a disc continuous side wall, and a first end wall spaced from a second end wall, with the side wall, the first end wall, the second end wall defining an outer housing shell, and the shell having a housing cavity contained within the shell, and weighted means positioned within the housing cavity for imparting a specific gravity greater than one to each of said disc members, and
the first end wall of each of said disc members includes a first numerical configuration, and the second end wall includes a second numerical configuration, and
the first numerical configuration defines a first transparent window directed through the first end wall into the housing cavity, and the second numerical configuration defines a second transparent window directed through the second end wall into communication with the housing cavity, and wherein the weighted means includes a first weight member mounted within the housing cavity in contiguous securement to the first end wall, and a second weighted member mounted within the housing cavity in contiguous communication to the second end wall, and illumination means positioned between the first transparent window and the second transparent window within the housing cavity for selective illumination to direct illumination through the first transparent window and the second transparent window.

2. An apparatus as set forth in claim 1 wherein the illumination means includes a battery bracket mounted within the housing cavity having a battery therewithin, and an illumination bulb mounting bracket spaced from the battery bracket, with the illumination bracket positioned between the first end wall and the second end wall within the housing cavity, and the illumination bulb mounting bracket mounting an illumination bulb, and the illumination bulb positioned medially between the first transparent window and the second transparent window, and a first electrical communication wire directed from the battery to the illumination bulb, and a second electrical communication wire directed from the battery to a contact post, and a suction cup mounted within the housing cavity arranged for selective securement to the second end wall, and a push button member mounted through the first end wall in alignment with the suction cup and a slide post mounted between the push button member and the suction cup, and the slide post slidably mounted through the illumination bulb mounting bracket, and a spring-biased contact plate arranged for spring-biased communication with the contact post, and the contact plate biased in spaced communication relative to the contact post to include an abutment arm mounted to the slide post, wherein the abutment arm is spaced from the contact plate in a first position when the suction cup is compressed against the second end wall, and when the abutment arm displaces the contact plate relative to the slide post in a second position when the suction cup is in a displaced orientation relative to the second end wall.

3. An apparatus as set forth in claim 2 wherein the slide post includes a slide post groove, and the illumination bulb mounting bracket includes a rib, wherein the rib is arranged for sliding reception within the groove to maintain alignment of the abutment arm relative to the contact plate.

* * * * *